Aug. 18, 1925.
O. J. WOLFE
1,549,947
CENTERING TOOL AND GAUGE
Filed June 13, 1924
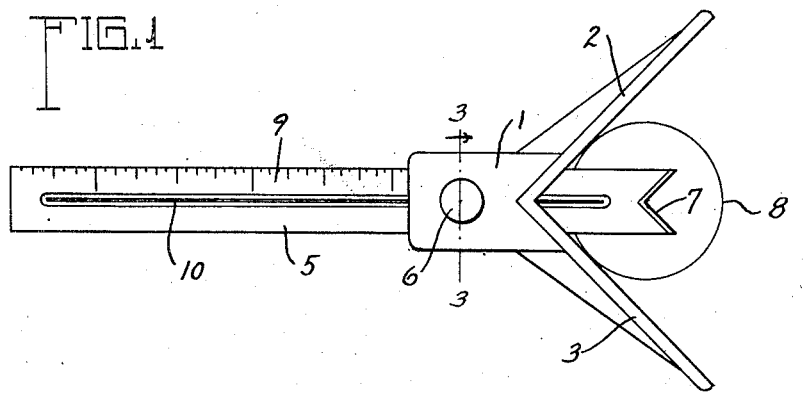
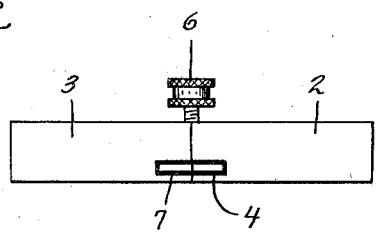
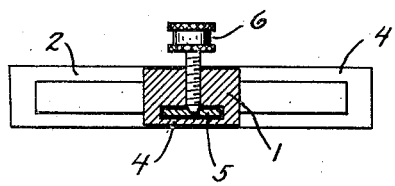
INVENTOR.
Otto J. Wolfe.
BY Walter N. Haskell.
his ATTORNEY.

Patented Aug. 18, 1925.

1,549,947

UNITED STATES PATENT OFFICE.

OTTO J. WOLFE, OF DAVENPORT, IOWA.

CENTERING TOOL AND GAUGE.

Application filed June 13, 1924. Serial No. 719,761.

*To all whom it may concern:*

Be it known that I, OTTO J. WOLFE, a citizen of the United States, residing at Davenport, in the county of Scott and State of Iowa, have invented certain new and useful Improvements in a Centering Tool and Gauge, of which the following is a specification.

My invention has reference to a centering tool and gauge, and has for its purpose to provide a convenient and positive means for determining the central point of a circular object, such as a hub or shaft. This is frequently difficult of accomplishment with the present tools in use for such purpose, on account of the necessity of securing two or more markings with such tools, at various angles. It frequently happens that it is impossible to do this, on account of the interference of other parts appurtenant to the circular device. With the present invention only one setting of the tool is required, the desired point for marking with a center punch or other tool being at once determined thereby.

Another feature thereof consists in the arrangement of a special gauge on the tool, giving radial measurements, so that by adjusting the tool by the guidance of such gauge the desired point on the object can be quickly established.

Another object of the invention is to provide the same with a means for use therewith of a scratch-awl or similar object, for laying out lines on a circular piece of work in the usual way, such as is done in preparing the work for milling out key-ways and similar purposes.

The device is not only useful for establishing points and lines on circular objects, but it can be applied to those having an oval or other irregular formation. It can also be used in laying out small squares and other figures on an object.

The above-named, and other features and advantages of the invention will more fully appear from the following specification, taken in connection with the accompanying drawings, in which:

Fig. 1 shows the invention in plan view.

Fig. 2 is an end view thereof, looking toward the faces of the arms 2 and 3.

Fig. 3 is a cross-section, on the line 3—3 of Fig. 1.

The reference numeral 1 indicates the body of the tool, from one end of which are projected arms 2 and 3, the faces of which are at a right angle with each other. The head 1 is provided with a longitudinal slot 4, in which is slidable a blade 5, having in that end adjacent to the arms 2 and 3 an angular recess 7, the angle of which corresponds with that of said arms. When the end of the blade 5 is properly positioned above a circular object, as shown in Fig. 1, the apex of the angle of the recess 7 will indicate the center of the circle thereof, which can be properly marked by a center-punch or similar tool. The recess 7 is preferably provided with a knife edge, with which the tapered end of the punch closely contacts, so that the end of the punch will not be forced away from the true center, which might occur if the end of the blade were formed with blunt faces.

One edge of the blade 5 is fitted with a graduated scale 9, provided with radial markings, establishing the points at which the recessed end of the tool should be set. These markings correspond with the distance from the center of the object to the apex of the angle formed by the arms 2 and 3, and as the diameter of the object to be marked is increased, the length of the marking is correspondingly increased, in accordance with the law of arithmetical progression. The proper marking is indicated at the end of the body 1, where the blade passes into the same. When the person using the tool is acquainted with the diameter of the object to be marked, by a proper calculation he can determine the radial marking, and set the tool accordingly. After the blade is given the desired adjustment, it is secured in place by the set-screw 6, to prevent any movement thereof out of position.

The edges of the recess 7 can also be used as guides for marking on the end of the object 8, in laying out squares or other figures thereon, after the center of the object has been determined.

The blade 5 is also provided with a knife-edge channel 10, extending lengthwise thereof, which may be used as a guide for the point of a scratch-awl or similar tool, for marking on the face of the object 8, for various purposes, which will at once suggest themselves to a mechanic.

What I claim, and desire to secure by Letters Patent, is:

1. In a device of the class described, a body portion, provided with a pair of arms disposed at a right angle with each other, and a blade slidable in said body portion, and provided in the end which projects into the angle of said arms with an angular recess provided with a knife edge, the angle of said recess corresponding with the angle of said arms, and the apexes of said angles being in alignment on a central line of said blade, dividing said angles equally.

2. In a device of the class described, a body portion and pair of arms projected therefrom at a right angle with each other; a blade slidable in said body portion, and provided in the end which projects into the angle of said arms with an angular recess corresponding with the angle of said arms; there being a scale on said blade provided with markings indicating the distances between the apexes of said angles; and means for holding said blade in adjusted positions with relation to said body portion.

3. In a device of the class described, a body member and pair of arms projected therefrom at a fixed angle with each other; a blade slidable in said body member and provided in the end which projects into the angle of said arms with a recess forming an angle corresponding with the angle of said arms; means carried by said blade for determining the distances between said angles; and a knife-edge slot extending longitudinally of said blade, on a center line thereof.

In testimony whereof I affix my signature.

OTTO J. WOLFE